UNITED STATES PATENT OFFICE.

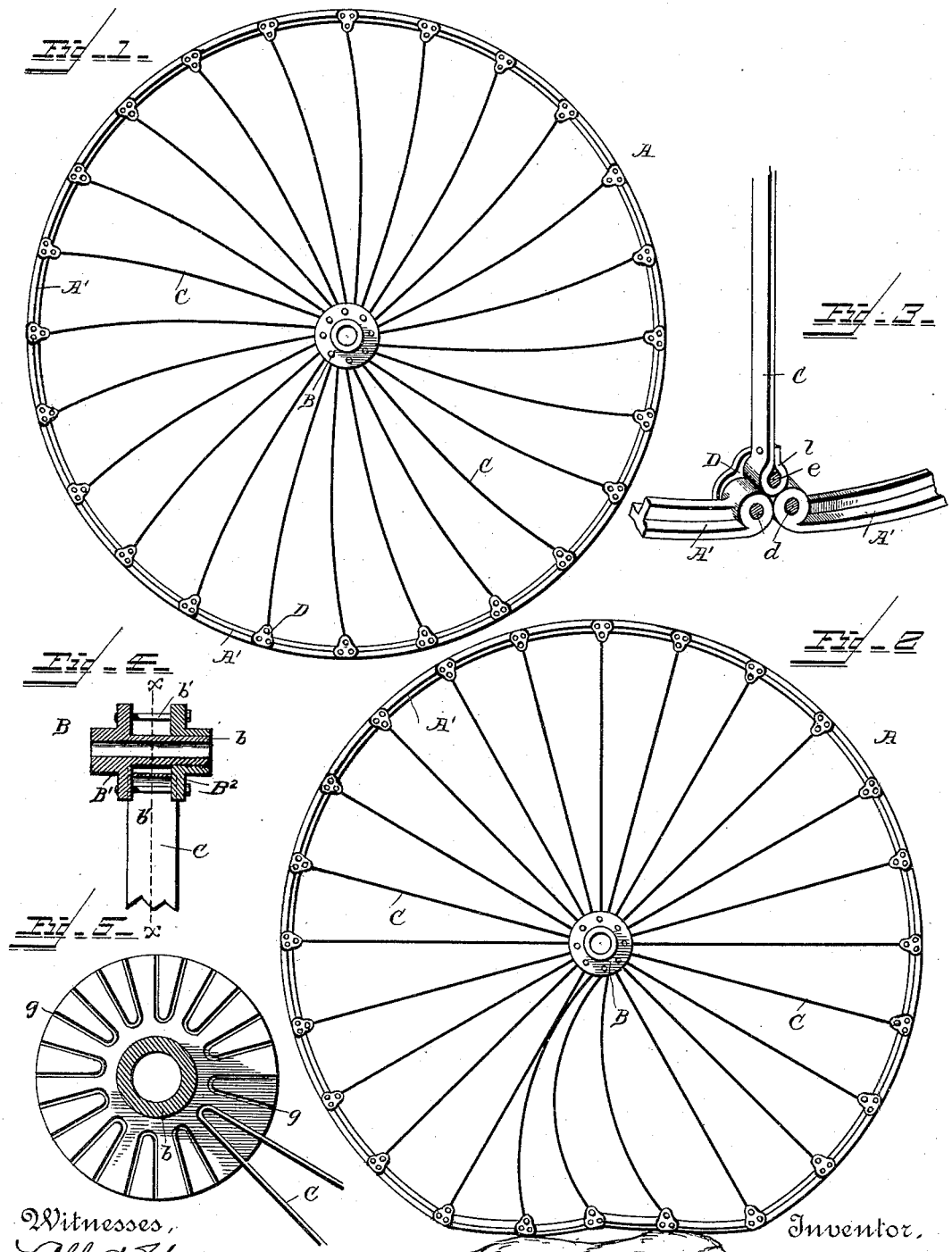

CAMPBELL E. JAMES, OF FRANKFORT, KENTUCKY.

VEHICLE-WHEEL.

SPECIFICATION forming part of Letters Patent No. 398,403, dated February 26, 1889.

Application filed June 22, 1888. Serial No. 277,930. (No model.)

*To all whom it may concern:*

Be it known that I, CAMPBELL E. JAMES, a citizen of the United States of America, residing at Frankfort, in the county of Franklin and State of Kentucky, have invented certain new and useful Improvements in Vehicle-Wheels, of which the following is a specification, reference being had therein to the accompanying drawings.

My invention relates to improvements in vehicle-wheels; and it has for its object to provide an elastic wheel suitable for carriages and buggies, but more especially applicable to baby-carriages, bicycles, and other vehicles in which it is desirable to avoid jolts and jars occasioned by the wheels as heretofore constructed coming in contact with obstructions in their path.

The invention consists in certain details of construction and combinations of parts, which will first be described in connection with the drawings, and then pointed out in the claims.

Figure 1 of the drawings is a side elevation showing the parts of the wheel in their normal positions. Fig. 2 is also a side elevation showing the positions assumed by certain sections of the rim and all the spokes while passing over an obstruction. Fig. 3 is an enlarged perspective view of portions of two of the rim-sections and one of the spokes, illustrating the manner of connecting the rim-sections and pivoting the spoke to the rim, one of the plates being removed. Fig. 4 is a longitudinal section of the hub with one of the spokes secured therein. Fig. 5 is an enlarged vertical section of the hub, taken on the line $x\,x$ of Fig. 4, further illustrating the manner of securing the spokes therein.

Referring to the drawings, A represents the rim of the wheel, which is made up of sections A', each of which describe the true arc of a circle. These rim-sections, which are equal in number to the number of spokes in the wheel, I prefer to make of cast-steel of T shape in cross-section, as seen in Fig. 3; but it is evident I can make them of other shapes—as, for instance, half-round. In fact, when the wheel is designed to be used in a bicycle, tricycle, or other like vehicle, the half-round shape would be desirable, for this would admit of the ready application of the ordinary rubber tire.

B represents the hub, consisting of two flanged castings, B' B², with one of which, B', the boxing $b$ is cast integral. The other casting, B², is so formed as to fit neatly over the boxing. The inner face of each casting is formed of grooves $g$, preferably continuous, as shown, so as to receive what are technically called "return-spokes." When the spokes are all in place in the hub, the two castings are secured together by means of bolts $b'$, as seen.

C represents the spokes. These are made of spring metal, and are preferably of the return kind—that is to say, the spoke passes down through one groove in the hub and up through another, and its two ends are secured to the rim, thus forming two spokes, as clearly shown in Fig. 5. The spokes are somewhat longer than the radius from the hub to the inner side of the rim, so that when they are in place they must necessarily be slightly curved or bent, as seen in Fig. 1.

The rim-sections are curved upward at their ends and are perforated for the reception of bolts. They are pivotally connected by means of plates D, each formed with three bolt-holes, through two of which and also through the ends of the rim-sections pass bolts $d$, which are riveted down onto the plates, there being plates D on each side of the rim. The outer end of each spoke is looped, as at $l$, and is pivotally secured to the rim by means of a bolt, $e$, passing through the other hole in the plates and through the loop in the spoke, this bolt being also riveted down onto the plates.

It will be seen in Fig. 2 that when the wheel encounters an obstruction in the road—such as a log or bowlder—the rim-sections will rock on their pivots and partially conform to the shape of the obstruction, and that as the rim thus assumes an abnormal shape the spokes in the immediate vicinity of the bend will receive a greater curve; but by reason of the tendency of the other portions of the rim to spring outward all the other spokes will straighten out, and thus firmly brace the rim. As the spokes are pivoted to the rim, there can be but little danger of breakage at that point when the rim is suddenly deflected.

A wheel constructed as above described will pass over an obstruction without jar, for the reason that the elastic spokes take up what little concussion may be engendered by the contact of the rim with a log, stone, &c.

Having thus described my invention, what I claim as new, and desire to secure by Letters Patent, is—

1. In a vehicle-wheel, the combination, with the hub, of a sectional rim and elastic spokes, the rim-sections being pivotally connected at their ends and the spokes secured in the hub and to the rim, for the purpose set forth.

2. In a vehicle-wheel, the combination, with the hub, of a sectional rim and elastic spokes of a length greater than the radius from the hub to the rim, the rim-sections being pivotally connected at their ends and the spokes rigidly secured in the hub and pivotally connected to the rim, for the purposes set forth.

3. In a vehicle-wheel, the combination, with the hub, of a rim constructed of rigid sections pivotally connected at their ends, and curved spring-metal spokes rigidly secured in the hub and pivotally connected to the rim, for the purposes set forth.

4. In a vehicle-wheel, the combination, with the hub, grooved as described, of a rim constructed of rigid metal sections pivotally connected at their ends, and curved flat spring-metal return-spokes rigidly secured in the grooves in the hub and pivotally connected to the rim at the junction of the sections, substantially as described, and for the purposes set forth.

In testimony wherof I affix my signature in presence of two witnesses.

CAMPBELL E. JAMES.

Witnesses:
WM. HUNTER MYERS,
ALBERT SPEIDEN.